C. L. B. DE SAUNIER.
COUPLING SHOCK ABSORBER.
APPLICATION FILED DEC. 22, 1919.

1,356,270.

Patented Oct. 19, 1920.
2 SHEETS—SHEET 1.

INVENTOR
CHARLES L. BAUDRY DE SAUNIER
BY Hmm and Hmm
ATTORNEYS

C. L. B. DE SAUNIER.
COUPLING SHOCK ABSORBER.
APPLICATION FILED DEC. 22, 1919.

1,356,270.

Patented Oct. 19, 1920.
2 SHEETS—SHEET 2.

INVENTOR
CHARLES L. BAUDRY DE SAUNIER
ATTORNEYS

UNITED STATES PATENT OFFICE.

CHARLES LOUIS BAUDRY DE SAUNIER, OF PARIS, FRANCE.

COUPLING-SHOCK ABSORBER.

1,356,270.  Specification of Letters Patent.  Patented Oct. 19, 1920.

Application filed December 22, 1919. Serial No. 346,605.

*To all whom it may concern:*

Be it known that I, CHARLES LOUIS BAUDRY DE SAUNIER, a citizen of Republic of France, residing at Paris, 108 Rue Lauriston, France, have invented a new and useful Coupling-Shock Absorber, of which the following is a specification.

The present invention relates to a device which has for object to absorb the shocks or forces which arise at the coupling of two vehicles of which one is towed by the other, for example a motor vehicle and its trailer, and in general between two movable bodies traveling in connection with one another.

If for example the special case be considered of a trailer towed by a motor vehicle, it will be seen that the trailer, especially when it is of the two wheeled type, undergoes both from the tractor and from the ground, forces which seriously affect its solidity and often indeed produce a breakage of the coupling.

These forces may be grouped under two categories: First, the forces due to the tractor, these being exerted in a substantially horizontal line and in two opposite directions, one set comprising the forces of starting and acceleration, which produce a tension between the vehicles, and the other set, directed in the opposite direction, comprising the decelerating or compression forces, and second, the forces due to the unevennesses of the ground, which place the tractor and the trailer in two planes inclined to the horizontal and forming an obtuse angle between them. These latter forces themselves may be divided into two groups, those which are exerted about a horizontal axis perpendicular to the longitudinal profile of the road; such are those which arise during the passing over a ditch or gully or a hump; they are produced successively in two opposite directions and tend to bend the coupling rod to and fro, and those which are exerted about a horizontal axis perpendicular to the foregoing; such are those which arise when one of the vehicles is laterally inclined in relation to the other. This relative angular displacement of the vehicle produces torsional efforts at their point of coupling.

The device which forms the subject of the present invention is characterized by the interposition at the point of connection of the two vehicles, of a single spring designed to be deformed both under the longitudinal displacements due to the forces of the first category and under the angular displacements occasioned by forces of the second category, so as to take up and absorb all these forces, whatever be their cause, their nature and their direction.

The accompanying drawings represent by way of example two methods of carrying out the invention; the device shown in Figures 2 to 6 is arranged to absorb the longitudinal forces of the first category and the angular forces of group (*a*) of the second category, this being generally sufficient in practice; as regards the modified device described with reference to Figs. 7 to 9, it allows the absorption of the whole of the angular and longitudinal forces.

Figure 1:
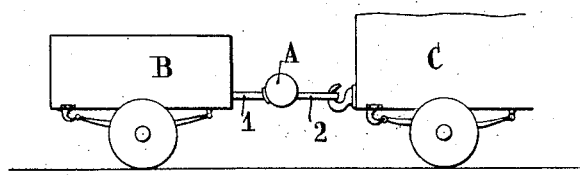
Fig. 1 is a diagrammatic view on a small scale in elevation, of a trailer and the rear part of a motor vehicle to which it is coupled by means of the present device.

The device is interposed at A in the coupling rod or drawbar which connects the trailer B to the rear of the tractor C (Fig. 1).

For this purpose the drawbar is formed in two parts 1 and 2, each of which is integral with one portion of the mechanism, the whole of which composes the shock absorbing device.

Figure 2:
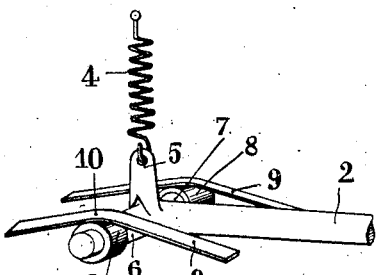
Fig. 2 is a perspective view showing the essential parts of the first construction.
Figure 3:
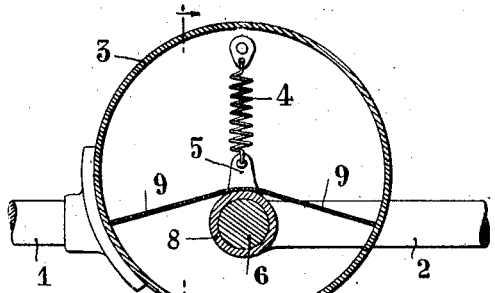
Fig. 3 is a section on line 3—3 of Fig. 4.
Figure 4:
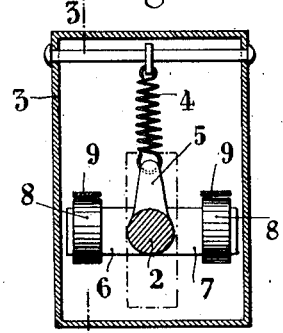
Fig. 4 is a section on line 4—4 of Fig. 3.

Upon the rearward part 1 or trailer-end of the drawbar is rigidly fixed a metal box or casing 3 arranged vertically and within which is suspended a coiled spring 4 (Figs. 2 to 4).

On the other hand, the forward part 2 or tractor-end of the drawbar enters the box through a slot and terminates in a lever arm or bell-crank arm 5 which is exactly perpendicular to the axis of the part 2 of the drawbar. Two stubs or journals 6 and 7 (see Fig. 4) form a cross-rod for the arms 2 and carry rollers 8 which bear against arched guide or cam plates 9, rigid with the box 3.

Figure 5:
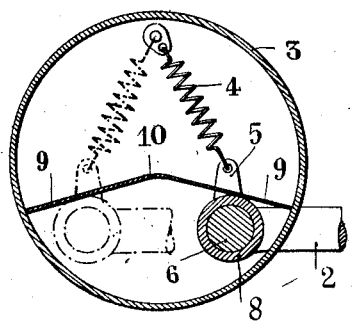
Fig. 5 is a section similar to Fig. 3, showing the displacements of the parts produced by forces of the first category.
Figure 6:
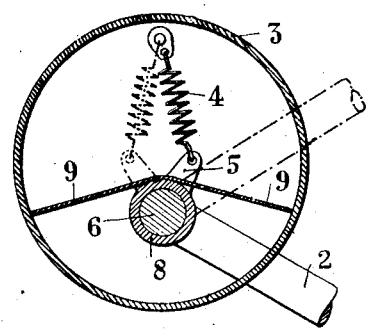
Fig. 6 is a similar section showing the displacements caused by forces of group (*a*) of the second category.

Fig. 5 shows by the displacements indicated therein how the longitudinal forces of the first category are absorbed, and Fig. 6 indicates the manner of absorption of the angular forces corresponding to group (a) of the second category, that is to say those which arise most frequently.

In order to facilitate the return of the spring and of the rollers to their central position, it is preferable to shape the guides 9 like a very wide reversed V, or curvilinear, or with a central notch, so that the end of the drawbar has always a tendency to return to the seat presented by the apex 10 of the V or the highest point of concavity or of the notch, as soon as the horizontal force which has displaced it has ceased to make itself felt (Figs. 2 and 3).

A series of graduations may be placed on the exterior of the box adjacent the slot through which the rod 2 enters for the purpose of indicating the angular relation between the rod 2 and the rod 1.

Figure 7:
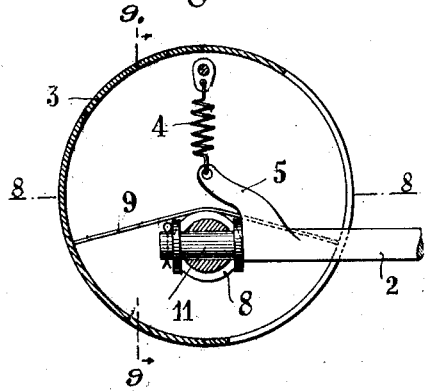
Fig. 7 is a vertical section of the second construction upon line 7—7 of Fig. 8.
Figure 8:
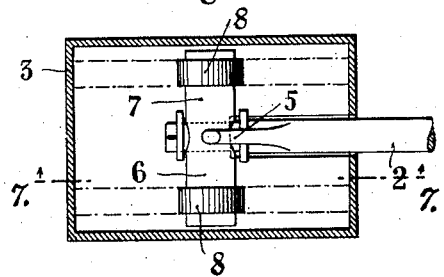
Fig. 8 is a horizontal section upon line 8—8 of Fig. 7.
Figure 9:
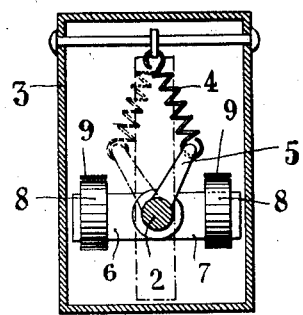
Fig. 9 is a vertical section upon line 9—9 of Fig. 7, showing the displacements caused by forces of group (*b*) of the second category.

The modification of construction represented in Figs. 7 to 9 differs from the preceding only as regards the part 2 of the drawbar which instead of being integral with the cross-member 6—7 terminates in a trunnion 11 which turns idly within the latter, so as to allow the lever arm 5 to oscillate to right and left of the axial plane of the vehicles (see Fig. 9) under the influence of torsional forces corresponding to group (b) of the second category.

It will be remarked that all the forces both longitudinal and regular developed in two perpendicular planes are thus cushioned by a single spring.

The cross-member 6—7, carrying the rollers 8, may be replaced by a ball capable of moving longitudinally and angularly in all directions upon the guides 9 and in general by any system of articulation by Cardan, universal or other joint.

These springs may be of any desired kind, metallic coiled or plate springs, rubber, pneumatic or other.

The guides may be of any suitable shape or even completely rectilinear. They may consist of plate applied to the inner walls of the box or of webs or flanges integral therewith; they may be afforded by slots formed in the walls of the box and into which the rollers enter, or in any other suitable manner.

Lastly, a shock absorbing device of this kind may be placed on each side of the trailer, or again this absorber and the coupling hook may be combined in one and the same member, without changing any essential feature of the invention.

I claim—

1. A coupling for vehicles comprising two shafts, a coupling member carried by each shaft, a trackway carried by the coupling member of one shaft, a roller carried by the coupling member of the second shaft and adapted to engage the said trackway, and resilient means interposed between the coupling members.

2. A coupling for vehicles comprising two shafts, a casing carried by one of the shafts, a trackway disposed within the casing, a roller on the end of the second shaft adapted to engage the trackway, and a spring connecting the second shaft to the casing.

3. A coupling for vehicles comprising two shafts, a casing carried by one shaft, a cross arm on the second shaft disposed within the said casing, a trackway within the casing, rollers on said cross arm adapted to engage said trackway, and a resilient connection between the casing and the second shaft.

4. A coupling for vehicles comprising two shafts; a casing carried by one shaft; a trackway in said casing; a cross arm rotatably mounted on the second shaft and disposed within the casing; rollers on said cross arm adapted to engage the trackway; and a spring connecting the casing and the second shaft.

5. A coupling for vehicles comprising two shafts; a casing carried by one shaft; a trackway in said casing; a roller on the second shaft engaging said trackway; a spring connecting the casing and the second shaft; and graduations on the casing adapted to indicate the angular relation between the two shafts.

In testimony whereof, I have signed my name to this specification.

CHARLES LOUIS BAUDRY DE SAUNIER.

Witnesses:
 EUGÉNE LEGIS,
 W. DEFÉVRIMONT.